Figure 1:
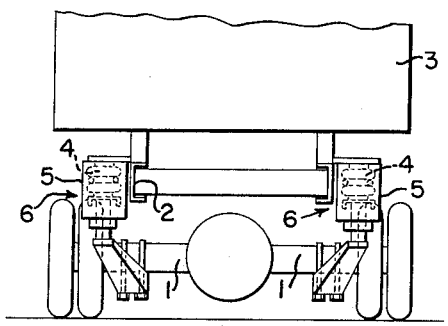

July 17, 1962 A. STENGELIN 3,044,762
PNEUMATIC SPRING SYSTEM
Filed July 13, 1959

INVENTOR
ADOLF STENGELIN

BY Dickel, Craig and Freudenberg
ATTORNEYS

United States Patent Office 3,044,762
Patented July 17, 1962

3,044,762
PNEUMATIC SPRING SYSTEM
Adolf Stengelin, Stuttgart, Germany, assignor to Daimler-Benz Aktiengesellschaft, Stuttgart-Unterturkheim, Germany
Filed July 13, 1959, Ser. No. 826,532
Claims priority, application Germany July 16, 1958
14 Claims. (Cl. 267—65)

The present invention relates to a motor vehicle provided with a pneumatic spring system and with a pneumatically-operated damping arrangement of which one each is coordinated to or operatively connected with each respective pneumatic spring.

In the prior art, friction-type shock-absorbers, hydraulic shock-absorbers or pneumatic shock-absorbers have been principally used as damping elements in motor vehicles which damping elements were built-in or installed as separate aggregates or units. The installation of these prior art damping aggregates or units oftentimes presents thereby constructive difficulties, especially if a relatively wide shock-absorber track is necessary for the effective damping of the swinging movement of the vehicle superstructure about the vehicle longitudinal axis.

Pneumatically-operated damping arrangements used heretofore which are arranged in the pneumatic springs themselves in most cases do not achieve a sufficient damp-action since the damping action occurs always during the expansion of the air in the pneumatic spring. Furthermore, in these prior art damping arrangements a larger additional volume of air becomes necessary.

The present invention, in contradistinction to these prior art arrangements, achieves an effective damping action, as is required particularly for relatively heavy types of vehicles, such as, for example, trucks and buses, combined with a simple construction and a very favorable possibility of purposefully accommodating the damping arrangement at the motor vehicle.

The present invention, therefore, essentially resides in a damping arrangement consisting of a pneumatic bellows in which air is drawn in through a valve from the atmosphere during the upward spring movements, i.e., during the spring movements when the respective vehicle axle moves in the direction toward the vehicle superstructure, and from which air is forced out in a throttled manner into the atmosphere during the outward spring movements, i.e., when the corresponding vehicle axle moves away from the vehicle superstructure.

According to a further feature of the present invention, the damping arrangement may advantageously consist of a roller-type bellows which is connected, on the one hand, with a part of the vehicle partaking in the spring movements thereof and, on the other, with another part of the vehicle not partaking in the spring movements thereof. According to a still further feature of the present invention, the two ends of the roller-type bellows of the damping arrangement may be connected in an advantageous manner with the vehicle part partaking in the spring movements thereof and the part of the roller-type bellows located intermediate the two ends thereof may be secured to that part of the vehicle which does not partake in the spring movements.

A particularly favorable possibility to accommodate such damping installation is achieved if, according to another feature in accordance with the present invention, the roller-type bellows of the damping arrangement is disposed directly below the pneumatic spring.

The ends of the roller-type bellows which partake in the spring movements may be arranged advantageously at a spring disc for the pneumatic spring and at a support part of lesser diameter provided for this spring disc, for example, at a spring support rod.

The other intermediate roller bellows portion secured to the part of the vehicle which does not partake in the spring movements may be secured advantageously at a pot-shaped spring-enclosure member surrounding both the pneumatic spring and the roller-type bellows.

According to another feature of the present invention, the valve of the damping arrangement may be constructed in a simple manner as a spring-loaded plate valve having a constant throttling aperture.

The valve seat may thereby be provided additionally with notches, grooves, recesses or similar cut-out portions which open-up with an increased pressure on the plate valve.

According to another feature of the present invention, the valve of the damping arrangement may also be controlled by a member dependent on the spring movement, for example, by means of a friction-type member or the like in order to obtain a more rapid and a more effective response of the valve assembly.

Accordingly, it is an object of the present invention to provide a damping arrangement for a pneumatic spring system and more particularly for each individual pneumatic spring thereof which obviates the disadvantages encountered with the prior art devices as pointed out hereinabove.

It is another object of the present invention to provide a simple damping arrangement for pneumatic springs which may be readily accommodated in a relatively restricted space of the motor vehicle.

Still another object of the present invention is the provision of a damping arrangement for use with pneumatic springs which is particularly useful in connection with heavy types of vehicles such as buses or trucks.

Another object of the present invention is the provision of a simple damping arrangement operated by pneumatic means which also includes a safety device to prevent the build-up therein of excessive pressures.

Still another object of the present invention is the provision of a shock-absorber-type pneumatic-damping arrangement for use with a pneumatic spring system which exhibits damping characteristics suitable for the pneumatic spring system.

Figure 3:
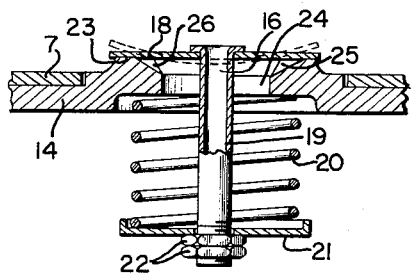
Figure 2:
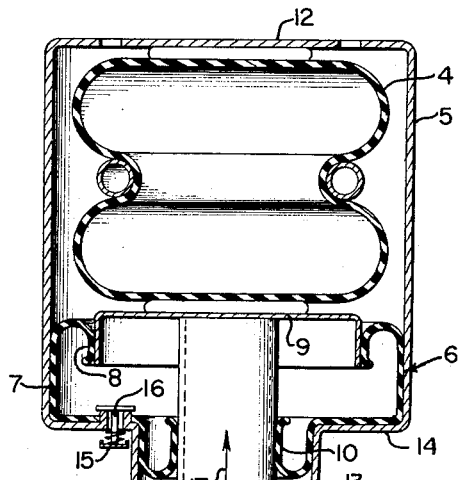
Figure 4:
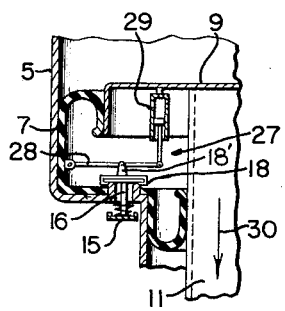
Figure 5:
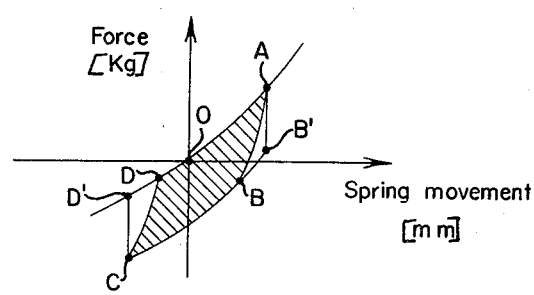

These and other objects, features and advantages of the present invention will become more obvious from the following description when taken in connection with the accompanying drawing which shows, for purposes of illustration only, several embodiments in accordance with the present invention, and wherein:

FIGURE 1 is a somewhat schematic rear view of a heavy-type motor vehicle such as a truck or bus provided with a pneumatic spring system and with a pneumatic damping arrangement in accordance with the present invention, FIGURE 2 is a cross-sectional view, on an enlarged scale, of a pneumatic spring provided with a damping arrangement in accordance with the present invention, FIGURE 3 is a partial cross-sectional view, on an enlarged scale, through a plate valve for use in the damping arrangement of the present invention, FIGURE 4 is a partial cross-sectional view through a modified embodiment of a damping arrangement in accordance with the present invention in which the plate valve of the damping arrangement is positively controlled, and FIGURE 5 is a diagram indicating the spring characteristics of a damping arrangement in accordance with the present invention.

Referring now to the drawing wherein like reference numerals are used throughout the various views to designate corresponding parts, and more particularly to FIGURE 1, reference numeral 1 designates a wheel axle member of any suitable construction which is spring supported with respect to a relatively stationary vehicle part such as the frame or the vehicle body, for example, of a self-supporting type vehicle body, by means of pneumatic springs 4 consisting of spring bellows. In order to protect the pneumatic spring 4 against soiling, stones, gravel or the like thrown thereagainst from the road, each pneumatic spring 4 is arranged within a pot-shaped spring enclosure member 5. A pneumatically-operated damping arrangement 6 operating by means of air is provided below each pneumatic spring 4 within the corresponding pot-shaped spring enclosure member 5 along the same wheel tread as the corresponding pneumatic spring 4, i.e., at the same distance from the vehicle longitudinal central plane as the corresponding pneumatic spring.

As may be seen more clearly from FIGURE 2, the damping arrangement 6 in accordance with the present invention is made of or consists of a roller-type bellows 7. One end 8 of the roller-type bellows 7 is secured to the spring disc member 9 for the pneumatic spring 4 whereas the other end 10 of the roller-type bellows 7 is secured at the support rod 11 supporting the spring disc member 9. The support rod 11 and the spring disc member 9 thereby partake in the spring movements of the vehicle axle member 1 with respect to the frame 2 or with respect to the vehicle body 3. The roller-type bellows 7 is operatively connected with the pot-shaped protective spring-enclosure member 5 intermediate its two ends 8 and 10. The upper end wall 12 of the pot-shaped spring enclosure member 5 serves as abutment or support surface for supporting the pneumatic spring 4 against the frame 2 whereas the bottom surface 14 of the pot-shaped spring enclosure member 5 provided with the flange portion 13 and concentrically surrounding therewith the support rod 11 serves for purposes of supporting the roller-type bellows 7 against the frame 2. The spring loaded valve 15 having a constant throttle aperture 16 extends through the bottom surface 14 of the pot-shaped spring enclosure member 5 and through the portion of the roller-type bellows 7 secured or connected with the pot-shaped protective spring enclosure member 5.

During spring movements of the vehicle axle member 1 in the direction of arrow 17 (FIGURE 2), i.e., in the upward direction as viewed in FIGURE 2, the pneumatic spring 4 is compressed by means of the upward movement of the support rod 11 and the spring disc member 9. Since the volume of the roller-type bellows 7 of the damping arrangement 6 increases during these inward or upward spring movements of spring support rod 11 in the direction of arrow 17, the internal pressure within the roller-type bellows 7 decreases whereupon the valve 15 is lifted from its valve seat so that air is drawn into the roller-type bellows 7 through the opened valve 15 during these inward or upward spring movements in the direction of arrow 17. As the vehicle axle member 1 moves in the opposite direction to the direction of arrow 17 during the outward or downward spring movements thereof, then the valve 15 closes instantly and the air previously drawn into the roller-type bellows 7 is permitted to escape from the roller-type bellows 7 only through the throttle bore or aperture 16 thereby providing simultaneously an effective damping action. The support rod 11 may also have any shape or form for purposes of achieving any desired damping characteristics other than the cylindrical form shown in the drawing.

The valve assembly according to FIGURE 3 for purposes of damping the spring movements essentially consists of a valve plate 18 on which is secured the threaded bolt member 19 provided with the throttling aperture 16. The compression spring 20 which supports or abuts against the surface 14 of the pot-shaped spring enclosure member 5 forces the valve plate 18 against the valve seat 23 through spring disc 21 and the nut member 22 secured to the opposite end of bolt member 18. The valve seat 23 is thereby annular shaped. Cut-out portions, grooves, notches or recesses 25 or the like are arranged radially inwardly from an intermediate diameter of the annularly-shaped valve seat which extend radially inwardly toward the valve opening 24. The grooves, notches or cut-out portions 25 may thereby be machined into the valve seat 23 by any suitable means, for example, by a side-milling cutter.

If the pressure within the roller-type bellows 7 above the valve plate 18 exceeds a predetermined amount, then the valve plate 18 which otherwise is not interrupted by slots or the like buckles in the center thereof to assume an arched shape and thereupon abuts only against the portion of the valve seat 23 disposed along the inner diameter thereof which is interrupted by the grooves, notches or cut-out portions 25 as indicated in FIGURE 3 in dot and dash lines which portion of the valve seat 23 is formed by the webs 26 disposed intermediate the grooves or notches 25. In that manner, air may additionally escape through the notches or grooves 25 into the atmosphere to prevent the build-up of dangerous pressures within the damping device 5.

For purposes of increasing the damping effectiveness and efficiency of the damping arrangement in accordance with the present invention as illustrated in FIGURES 1 through 3, a control installation generally designated by reference numeral 27 may be provided within the roller-type bellows 7. Valve plate 18 is thereby operatively connected with the pneumatic damping member 29 consisting of a piston and cylinder by means of a bow-shaped member 18' surrounding the valve plate 18 through a lever 28. During a movement of the spring disc member 9 and of the spring support rod 11 in the direction of the arrow 30 (FIGURE 4), i.e., in the downward direction as viewed in FIGURE 4 at first the throttle bore 16 is closed by a closure member (not shown in detail) arranged at the bow-shaped member whereupon the valve 15 itself is closed. During the bending or buckling of the valve plate 18, however, a communicating passage or aperture is again created through notches 25 as explained and described hereinabove in connection with FIGURE 3. During a movement in a direction opposite to the arrow 30, i.e., in the upward direction as viewed in FIGURE 4, the valve 15 is opened against the force of the valve spring 20 and of the pressure prevailing above the valve plate 18.

FIGURE 5 schematically illustrates the diagram of the spring characteristics of an installation in accordance with the present invention during one inward and outward spring movement thereof for a predetermined, given spring stroke. The origin O of the coordinate system corresponds to the normal position of the spring as installed into the vehicle. During an inward spring movement, i.e. during an upward spring movement of the axle member 1 of FIGURE 1 with respect to the vehicle superstructure 2 or 3, the curve of the spring characteristics follows the curve from O to A in accordance with the spring characteristics of a conventional system. With the beginning of the outward spring movement, i.e. with the commencement of the downward spring movement of the axle member 1 as viewed in FIGURE 1, the damping arrangement in accordance with the present invention becomes effective in that the increase in pressure within the damping arrangement results in an overall spring characteristic along the curve from A to B. With a continued outward or downward spring movement of the axle member 1, the valve plate 18 now buckles or becomes arched under the pressure prevailing within the damping arrangement according to the present invention so that the pressure within the damping bellows 7 remains essentially constant and the spring characteristic proceeds along line B—C. With a repeated inward or upward spring movement of the axle member 1, the pressure within the damping arrangement gradually decreases along line C—D of the spring characteristic until finally from point D to the origin O air is again drawn into the damping bellows 7 whereupon the damping arrangement according to the present invention no longer exerts any effective influence on the spring characteristics of the main pneumatic spring 4. The damping work diagram is indicated by the cross-hatched area A—B—C—D.

With the use of a controlled valve actuation by means of the control system illustrated in FIGURE 4, the spring characteristics of the overall system remain corresponding, except that the spring characteristic now follows the curve A—B'—C—D' which represents an increase in the damping work as indicated by the relatively larger area A—B'—C—D' compared to the area A—B—C—D.

The term vehicle "superstructure" is used in the specification and claims herein to designate a relatively stationary vehicle part such as the frame, auxiliary frame or vehicle body, for instance, of a self-supporting type vehicle body.

While I have shown and described several embodiments in accordance with the present invention, it is understood that the same is not limited thereto but is susceptible of many changes and modifications within the spirit and scope of the present invention, and I, therefore, do not wish to be limited to the details described and illustrated herein but intend to cover all such changes and modifications as are encompassed by the scope of the appended claims.

I claim:

1. In a motor vehicle having a first vehicle part participating in the spring movements thereof and a second vehicle part non-participating in said spring movements, said vehicle including a pneumatic spring system provided with pneumatic spring means for supporting said vehicle, a pneumatically actuated damping arrangement coordinated to a respective pneumatic spring means for dampening the action of said pneumatic spring means comprising pneumatic bellows means having two ends and an intermediate bellows portion disposed between said two ends, and valve means operatively connected with said bellows means, said valve means being so constructed and arranged that during spring movements in one direction air is drawn in through said valve means into said bellows means from the atmosphere while air is discharged with a predetermined throttling into the atmosphere during spring movements in the opposite direction, the two ends of said bellows means being secured to said first vehicle part and said intermediate bellows portion being secured to said second vehicle part.

2. In a motor vehicle, the combination according to claim 1, wherein said bellows means is arranged below a respective pneumatic spring means.

3. In a motor vehicle, the combination according to claim 2, wherein said first vehicle part includes disk and support means of smaller diameter than said disk for supporting thereon said disk, and wherein one end of each bellows means is secured to said disk and the other end thereof to said support means.

4. In a motor vehicle, the combination according to claim 3, wherein each said pneumatic spring system includes a pot-shaped enclosure member surrounding each said pneumatic spring means and said bellows means, and wherein said bellows portion is secured to said pot-shaped member.

5. In a motor vehicle, the combination according to claim 1, further comprising protective means surrounding the pneumatic spring means and damping arrangement assembly, said bellows portion being secured to said protective means.

6. In a motor vehicle, the combination according to claim 1, wherein said valve means includes a spring-loaded valve plate provided with a constant throttling aperture and a valve seat provided with cut-out portions and web portions, and wherein said valve plate is so constructed and arranged as to open up said cut-out portions when the pressure above said valve plate is in excess of a predetermined pressure.

7. In a motor vehicle, the combination according to claim 6, wherein said valve plate is so constructed and arranged as to buckle and rest upon said web portions thereby opening up said cut-out portions when the pressure above said valve plate is in excess of a predetermined pressure.

8. In a motor vehicle, the combination according to claim 1, further comprising control means operatively connected with a respective pneumatic spring means for controlling the operation of said valve means in dependence on the spring movements of said pneumatic spring means, said control means including a member so constructed and arranged as to control the predetermined throttling of air into the atmosphere and means operatively connected between said first and second portions for controlling the operation of said member.

9. In a motor vehicle having a first vehicle part participating in the spring movements thereof and a second vehicle part non-participating in the spring movements, said vehicle including a pneumatic spring system provided with at least one pneumatic spring means including a first bellows means for supporting said vehicle, a pneumatically actuated dampening arrangement coordinated to a respective pneumatic spring for dampening the action of said pneumatic spring means comprising a second pneumatic bellows means connected between said first and second vehicle parts and a valve means operatively connecting the interior of said second bellows means with the atmosphere, said valve means including a spring-loaded valve plate provided with a constant throttling aperture and a valve seat provided with cut-out portions and web portions, said valve plate being adapted to buckle and rest upon said web portions to thereby open up said cut-out portions for discharge of air from the interior of said second bellows means when the pressure above said plate exceeds a predetermined amount, said valve means being so constructed and arranged that during spring movement in one direction air is drawn in through said valve means into said second bellows means from the atmosphere while air is discharged through said aperture into the atmosphere with a predetermined straddling during spring movement in the opposite direction.

10. In a motor vehicle having a first vehicle part participating in the spring movements thereof and a second vehicle part non-participating in said spring movements, said vehicle including a pneumatic spring system provided with at least one pneumatic spring means including a first bellows means for supporting said vehicle, a pneumatically actuated dampening arrangement coordinated to a respective pneumatic spring means for dampening the action of said pneumatic spring means comprising a second pneumatic bellows means connected between said first and second vehicle parts, said second vehicle part forming an enclosure member containing each said pneumatic spring means and the respective dampening arrangement therefor, and a valve operatively connecting the interior of said second bellows means with the atmosphere including a throttling bore extending therethrough, said valve being so constructed and arranged that during spring movements in one direction air is drawn in through said valve means into said second bellows means from the atmosphere while air is discharged through said throttling bore with a predetermined throttling into the atmosphere during spring movements in the opposite direction.

11. In a motor vehicle provided with a vehicle superstructure, a pneumatic spring system including at least one pneumatic spring, axle means including actuating means for actuating a corresponding pneumatic spring, said actuating means partaking in the spring movements of the axle means, said pneumatic spring including a part unaffected by the spring movements of the corresponding axle means, and a pneumatically actuated dampening arrangement coordinated to said pneumatic spring comprising pneumatic bellows means including two ends and an intermediate bellows portion disposed between said two ends, the two ends of said bellows means being operatively connected with said actuating means and the intermediate bellows portion being operatively connected with said spring part, and valve means operatively connecting the interior of said bellows means with the atmosphere, said valve means being so constructed and arranged that during spring movements in one direction air is drawn in through said valve means into said bellows means from the atmosphere and during spring movements in the opposite direction air is discharged with a predetermined throttling into the atmosphere, said one direction corresponding to a movement of said axle means in the direction toward the vehicle superstructure and said opposite direction corresponding to a movement of said axle means away from said superstructure.

12. A motor vehicle according to claim 11, wherein said valve means includes a valve plate and a valve seat provided with cut-out portions and web portions, and wherein said valve plate is so constructed and arranged as to buckle and rest upon said web portions thereby opening up said cut-out portions and partially opening up said valve means when the pressure within said damping arrangement exceeds a predetermined pressure.

13. In a motor vehicle, the combination according to claim 12, wherein said valve plate is a spring-loaded valve plate provided with a constant throttling aperture to provide for said predetermined throttling of air into the atmosphere during spring movements in said opposite direction.

14. In a motor vehicle, the combination according to claim 13, further including control means operatively connected with said pneumatic spring means for controlling the operation of said valve means in dependence on the spring movements of said pneumatic spring means, said control means including valve means for said constant throttling aperture and means connected between said actuating means and the unaffected part of said pneumatic spring for controlling operation of said last-mentioned valve means.

References Cited in the file of this patent

UNITED STATES PATENTS

| | | |
|---|---|---|
| 1,085,818 | Oxnard | Feb. 3, 1914 |
| 1,475,049 | Church | Nov. 20, 1923 |
| 2,443,433 | Sanmori | June 15, 1948 |
| 2,713,498 | Brown | July 19, 1955 |
| 2,820,569 | Peterson | Jan. 21, 1958 |
| 2,877,872 | Krizan | Mar. 17, 1959 |